Jan. 6, 1959 A. P. MERTESDORF 2,867,040
HEDGE CUTTER
Filed Aug. 19, 1957 2 Sheets-Sheet 1

INVENTOR.
ALOYS P. METESDORF
BY
Braddock and Braddock
ATTORNEYS

Jan. 6, 1959

A. P. MERTESDORF 2,867,040

HEDGE CUTTER

Filed Aug. 19, 1957

INVENTOR.
ALOYS P. METESDORF
BY
Braddock and Braddock
ATTORNEYS

United States Patent Office 2,867,040
Patented Jan. 6, 1959

2,867,040
HEDGE CUTTER

Aloys P. Mertesdorf, Minneapolis, Minn.

Application August 19, 1957, Serial No. 679,002

5 Claims. (Cl. 30—205)

The invention herein has relation to a cutter which can be used for various purposes but has been devised to be especially useful when employed to trim or cut hedges and the like.

The object of the invention is to provide a hedge cutter of simple, inexpensive, novel and improved construction.

In the accompanying drawings forming a part of this specification,

Figure 1:
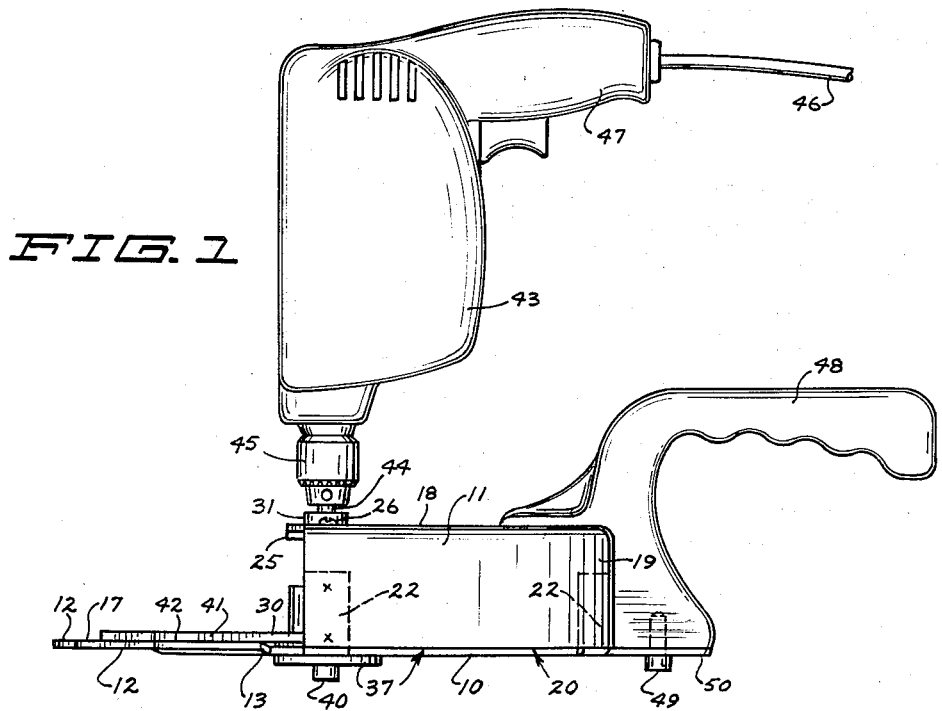
Fig. 1 is a side elevational view of a hedge cutter made according to the invention as when applied to use.

A frame of the hedge cutter is constituted as a base member or cutter plate 10 and a body member 11 upon and rigid with said base member or cutter plate.

The base member or cutter plate 10 is composed as a flat, part-circular slab integrally supporting circumferentially spaced cutting teeth 12 offset, as at 13, interiorly from said part-circular slab and in parallel relation thereto. The cutting teeth 12 are in a single plane and extensive throughout an arc approaching but less than 180 degrees, and outer ends of said cutting teeth terminate substantially in the circumference or perimeter of the part-circular slab. A flat, straight, forward bounding surface 14 of each cutting tooth extends inwardly and rearwardly from the outer end thereof and is in perpendicular relation to the base member or cutter plate widthwise thereof in the disclosure as made. A curved, rearward bounding surface 15 of each cutting tooth extends rearwardly and inwardly from the cutting tooth outer end, and the inner end of the forward bounding surface of each cutting tooth merges in an outwardly facing, part-circular surface, each denoted 16, itself merging in the inner end of the rearward bounding surface of the next adjacent forward cutting tooth. The forward bounding surfaces 14 are in spaced relation to the rearward bounding surfaces 15 and at equal angular relation to each other. As shown, said forward bounding surfaces diverge outwardly of the base member or cutter plate. The straight interior edges of the forward bounding surfaces 14 meet the interior surface of the base member or cutter plate 10 to provide straight knife edges, each indicated 17.

The body member 11 is of part-circular configuration. A flat, part-circular element 18 of said body member is in spaced, parallel relation to the base member or cutter plate 10, and a part-circular element 19 of the body member, integral with the circumferential margin of the part-circular element 18, spans the distance between and is in perpendicular relation to both said base member or cutter plate and said part-circular element. The base member or cutter plate 10 is circumferentially cut away to provide arc shape slots 20 in the frame, and spaced flanges 21 upon and integral with the circumferential margin of said base member or cutter plate extend interiorly therefrom in perpendicular relation thereto. The spaced flanges 21 are in engaged relation with an internal cylindrical surface of the part-circular element 19 of the body member and can be secured thereto in any suitable and convenient manner. As disclosed, said spaced flanges and the part-circular element 19 are united by welding, at 22. The body member 11 as shown extends throughout an arc of substantially 180 degrees, and when said body member and the base member or cutter plate are assembled to provide the frame, the cutting teeth 12 will be situated exteriorly of the body member at a side thereof, in parallel relation to the flat, part-circular element 18 of said body member, as well as in parallel relation to the part-circular slab of said base member or cutter plate and in a plane between said flat, part-circular element 18 and said part-circular slab.

An intermediate part of an interior edge portion 23 of the flat, part-circular element 18 of the body member 11 of the frame is cut away, as at 24, and a bearing member 25 is rigidly secured, as at 26, against an internal surface of said flat, part-circular element 18 to lie in covering relation to said cut-away portion. A circular opening 27 through the bearing member 25 is in concentric relation to the part-circular element 19.

An opening through the part-circular slab of the base member or cutter plate 10 snugly contains a circular bearing member 28 having a circular opening 29 therethrough in alined relation with the circular opening 27 through the bearing member 25.

A flat, elongated cutter bar 30, of rectangular configuration, is supported upon the frame of the hedge cutter in parallel, adjacent relation to the base member or cutter plate thereof and the cutting teeth 12 of said base member or cutter plate for movement of rotation. An exterior end portion of a spindle 31 is mounted, as at 32, in the circular opening 27 and extends to position exteriorly of the bearing member 25. An interior end 33 of said spindle is in engaged relation with a surface of the cutter bar opposite the base member or cutter plate 10. A screw bolt 34 extends through the circular opening 29 in the bearing member 28, as well as through a central opening 35 in the cutter bar, and is engaged with an internal thread 36 in the interior end portion of the spindle 31. The screw bolt 34 also extends through a disc 37 disposed exteriorly of the base member or cutter plate, a washer 38 between said disc and the bearing member 28 and a spacer 39 between said cutter bar and base member or cutter plate. A head 40 of or on said screw bolt is rotatably engaged against an exterior surface of the disc 37. The construction and arrangement will be such that when the screw bolt is turned home in the internal thread 36 of the spindle 31, the cutter bar 30 will be clamped between said spindle and the spacer 39, and said cutter bar, the screw bolt, the bearing member 28 and the disc 37 will be rotatable as a unit with the spindle in response to rotation of said spindle. The construction and arrangement also will be such that internal surfaces of outer end portions of the cutter bar will slide over the internal surfaces of the cutting teeth 12 when said cutter bar is rotated.

Flat, straight, forward or advancing bounding surfaces 41 of the cutter bar 30, at opposite sides of the spindle 31 and the screw bolt 34, are in perpendicular relation to said cutter bar widthwise thereof, and the straight interior edges of said forward or advancing bounding surfaces 41 meet the interior surface of the cutter bar to provide straight knife edges, each represented 42.

Figure 2:
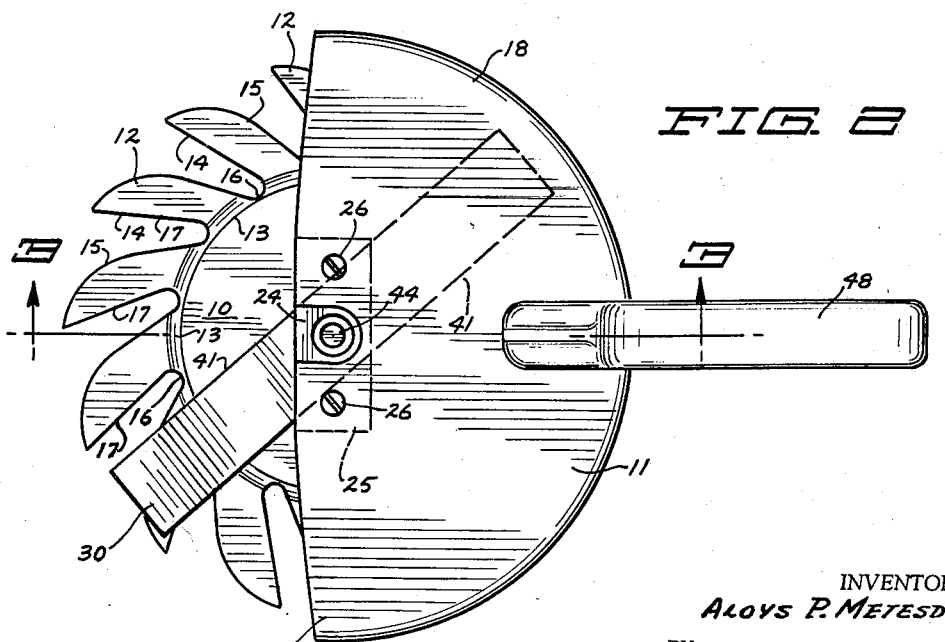
Fig. 2 is an enlarged top plan view of said hedge cutter.
Figure 3:
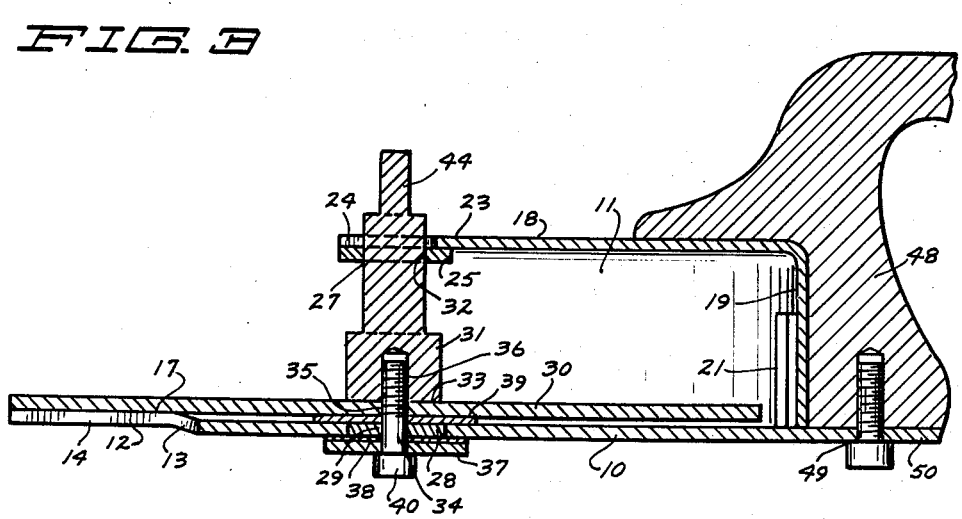
Fig. 3 is an enlarged sectional view, taken on line 3—3 in Fig. 2.
Figure 4:
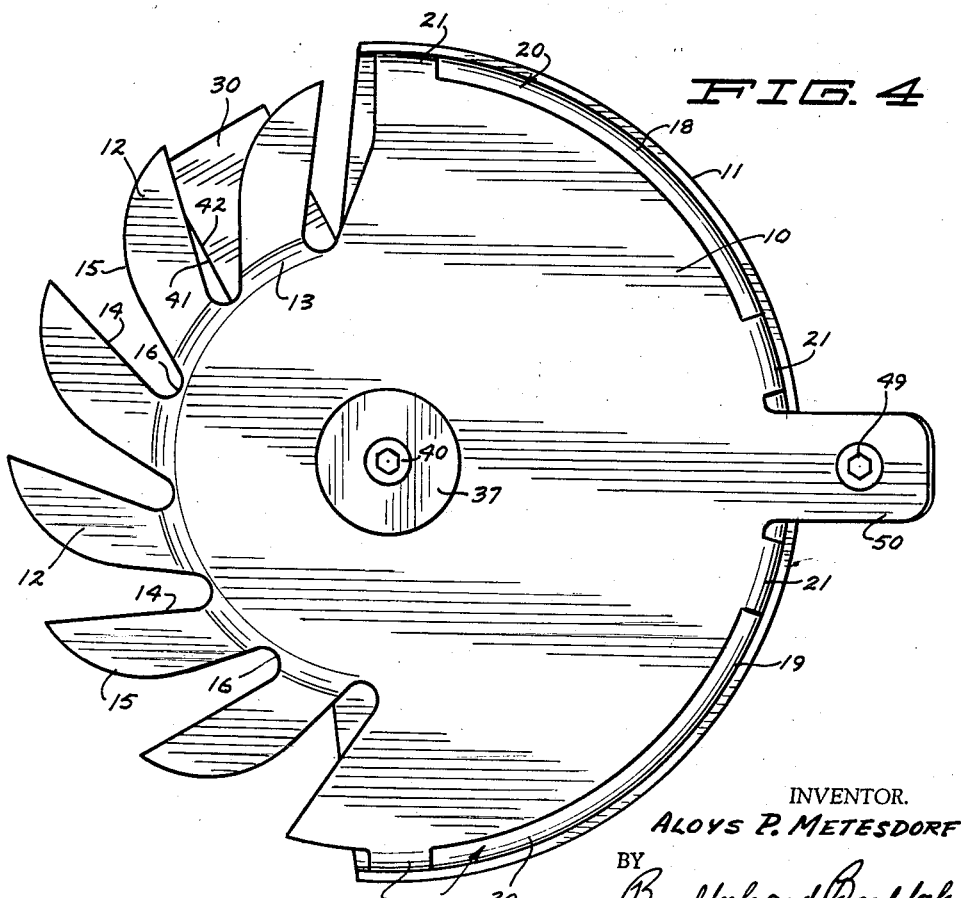
Fig. 4 is an enlarged bottom plan view of the hedge cutter.

A drill motor 43 will be employed to rotate the spindle 31, thus to cause the cutter bar to be advanced from front toward rear of and over the cutting teeth 12 of the base member or cutter plate 10, in clockwise direction in Fig. 2 of the drawings. As shown in Fig. 1, the driven shaft of the drill motor is releasably assembled with a projection 44 integral and alined with the spindle through the instrumentality of a chuck 45 which can be of ordinary or preferred construction. An extension cord 46 leading to said drill motor is for connection with a suitable source of electrical energy.

A first handle of or for the hedge cutter is constituted as a usual handle, denoted 47, of the drill motor, and a second handle 48 of or for said hedge cutter is rigid with the frame thereof. As shown, the second handle is fixedly secured, as at 49, to an extension 50 upon and alined with the base member or cutter plate 10. The first and second handles 47 and 48 are in spaced relation at the same side of the device and in a single plane.

In practice, the first and second handles 47 and 48 will be grasped by a workman and the device while operative will be advanced to a hedge, or the like, to be trimmed or cut in a manner which will be obvious. The cutting teeth 12, the cutter bar 30 and the knife edges 17 and 42 of said cutting teeth and cutter bar evidently will cause all growth made or caused to enter between the cutting teeth to be severed.

What is claimed is:

1. A hedge cutter comprising a flat plate, circumferentially spaced teeth in a single plane at a side of and rigid with said plate, each of said spaced teeth being bounded by a straight forward surface and a curved rearward surface in meeting relation to each other at an outer end thereof, said forward surfaces extending inwardly and rearwardly and said rearward surfaces extending rearwardly and inwardly, the inner end of each forward surface merging in the inner end of the rearward surface of a next adjacent forward tooth and said forward surfaces providing first knife edges, a bearing member in spaced relation to and rigid with said plate, a shaft rotatably mounted in the plate and bearing member in perpendicular relation to said plate, a cutter bar in adjacent relation to the plate and teeth fixed on said shaft, an advancing internal bounding surface of said cutter bar providing a second knife edge, and means for accomplishing rotation of the shaft with cutter bar to cause said second knife edge to be slid over said first knife edges in direction rearwardly of said teeth.

2. A hedge cutter comprising a flat plate, circumferentially spaced teeth in a single plane at a side of, offset inwardly from and in rigid, parallel relation to said plate, each of said spaced teeth being bounded by a straight forward surface and a curved rearward surface in meeting relation to each other at an outer end thereof, said forward surfaces extending inwardly and rearwardly and said rearward surfaces extending rearwardly and inwardly, the inner end of each forward surface merging in the inner end of the rearward surface of a next adjacent forward tooth and said forward surfaces providing first knife edges, a bearing member in spaced relation to and rigid with said plate, a shaft rotatably mounted in the plate and bearing member in perpendicular relation to said plate, a cutter bar in adjacent relation to the plate and teeth fixed on said shaft, an advancing internal bounding surface of said cutter bar providing a second knife edge, and means for accomplishing rotation of the shaft with cutter bar to cause said second knife edge to be slid over said first knife edges in direction rearwardly of said teeth.

3. A hedge cutter comprising a flat plate, circumferentially spaced teeth in a single plane at a side of and rigid with said plate, each of said spaced teeth being bounded by a straight forward surface and a curved rearward surface in meeting relation to each other at an outer end thereof, said forward surfaces extending inwardly and rearwardly and said rearward surfaces extending rearwardly and inwardly, the inner end of each forward surface merging in the inner end of the rearward surface of a next adjacent forward tooth and said forward surfaces providing first knife edges, a bearing member in spaced relation to and rigid with said plate, a shaft rotatably mounted in the plate and bearing member in perpendicular relation to said plate, a cutter bar in adjacent relation to the plate and teeth fixed on said shaft, an advancing internal bounding surface of said cutter bar providing a second knife edge, a device for accomplishing rotation of the shaft with cutter bar to cause said second knife edge to be slid over said first knife edges in direction rearwardly of said teeth, a first handle rigid with said device, and a second handle rigid with said plate.

4. A hedge cutter comprising a flat plate, circumferentially spaced teeth in a single plane at a side of, offset inwardly from and in rigid, parallel relation to said plate, each of said spaced teeth being bounded by a straight forward surface and a curved rearward surface in meeting relation to each other at an outer end thereof, said forward surfaces extending inwardly and rearwardly and said rearward surfaces extending rearwardly and inwardly, the inner end of each forward surface merging in the inner end of the rearward surface of a next adjacent forward tooth and said forward surfaces providing first knife edges, a bearing member in spaced relation to and rigid with said plate, a shaft rotatably mounted in the plate and bearing member in perpendicular relation to said plate, a cutter bar in adjacent relation to the plate and teeth fixed on said shaft, an advancing internal bounding surface of said cutter bar providing a second knife edge, a device for accomplishing rotation of the shaft with cutter bar to cause said second knife edge to be slid over said first knife edges in direction rearwardly of said teeth, a first handle rigid with said device, and a second handle rigid with said plate, said first and second handles being in a single plane.

5. In a hedge cutter, a flat plate, a first bearing member in spaced, rigid relation to said plate, a cutter bar in adjacent, parallel relation to the plate, said plate having a circular opening therethrough in concentric relation to said first bearing member, a second bearing member snugly rotatable in said circular opening, a spindle mounted in said first bearing member and including an inner end portion having a threaded opening therein concentric with said first and second bearing members, an inner end of the spindle being engaged against said cutter bar, a disc in proximate relation to a surface of said plate opposite the cutter bar and surrounding the second bearing member, and a screw bolt securing said cutter bar in fixed relation to said spindle, said screw bolt being concentric with said first and second bearing members, extending through the cutter bar, the second bearing member and said disc and including a threaded end portion engaged with the threaded opening in said spindle and a head in proximate relation to a surface of said disc opposite said plate.

References Cited in the file of this patent

UNITED STATES PATENTS

| 1,665,155 | Yerger | Apr. 3, 1928 |
| 1,871,606 | Haddad | Aug. 16, 1932 |
| 1,901,992 | Smith | Mar. 21, 1933 |
| 2,617,189 | Brown | Nov. 11, 1952 |
| 2,629,220 | Grieder | Feb. 24, 1953 |
| 2,645,010 | Holmes | July 14, 1953 |
| 2,653,381 | Rooke | Sept. 29, 1953 |
| 2,794,248 | Buchanan | June 4, 1957 |